(12) United States Patent
Panzer

(10) Patent No.: US 10,994,433 B2
(45) Date of Patent: May 4, 2021

(54) FILTER SYSTEM

(71) Applicant: Surgical Site Solutions, Inc., Sheboygan, WI (US)

(72) Inventor: Larry H. Panzer, Sheboygan Falls, WI (US)

(73) Assignee: Surgical Site Solutions, Inc., Sheboygan, WI (US)

( * ) Notice: Subject to any disclaimer, the term of this patent is extended or adjusted under 35 U.S.C. 154(b) by 0 days.

(21) Appl. No.: 16/523,485

(22) Filed: Jul. 26, 2019

(65) Prior Publication Data

US 2019/0344459 A1    Nov. 14, 2019

Related U.S. Application Data

(60) Division of application No. 15/465,082, filed on Mar. 21, 2017, now Pat. No. 10,406,703, which is a continuation of application No. 14/531,463, filed on Nov. 3, 2014, now Pat. No. 9,604,372, which is a division of application No. 13/162,084, filed on Jun. 16, 2011, now Pat. No. 8,876,981.

(51) Int. Cl.
*B26B 19/44* (2006.01)
*B01D 46/00* (2006.01)

(52) U.S. Cl.
CPC .......... *B26B 19/44* (2013.01); *B01D 46/0002* (2013.01); *B01D 46/0046* (2013.01)

(58) Field of Classification Search
None
See application file for complete search history.

(56) References Cited

U.S. PATENT DOCUMENTS

| | | |
|---|---|---|
| 2,129,559 A | 9/1938 | Blackwell |
| 3,331,130 A | 7/1967 | Ligon |
| 4,479,311 A | 10/1984 | Blanco |
| 5,031,320 A | 7/1991 | Persyn |
| 5,216,822 A | 6/1993 | Madiedo |
| 5,433,107 A | 7/1995 | Brauchli et al. |
| 5,810,911 A | 9/1998 | Behrendi et al. |
| 7,076,878 B2 | 7/2006 | Degregorio, Jr. |
| 2005/0120511 A1 | 6/2005 | Pedersen |
| 2006/0230619 A1 | 10/2006 | Williams et al. |
| 2009/0159535 A1 | 6/2009 | Hershberger et al. |
| 2009/0223058 A1 | 9/2009 | Coleman et al. |
| 2013/0091654 A1 | 4/2013 | Smith |

FOREIGN PATENT DOCUMENTS

| | | |
|---|---|---|
| EP | 0556435 A1 | 6/1992 |
| GB | 2353942 A | 3/2001 |

*Primary Examiner* — Eric W Golightly
(74) *Attorney, Agent, or Firm* — Dinsmore & Shohl LLP

(57) ABSTRACT

In one aspect, the present disclosure provides a housing for a vacuum filter assembly. The housing may include a top piece with an upper portion defining a top wall of a cavity and a generally circular perimeter forming a side wall of the cavity. The perimeter of the top piece may be configured to receive a filter member. An input aperture may extend through the top piece and may be arranged for communication with the cavity. A spindle may extend into the cavity from the top wall of the cavity such that a material drawn into the cavity by a vacuum force moves in a spiral vortex through the cavity about the spindle.

15 Claims, 5 Drawing Sheets

FILTER SYSTEM

CROSS REFERENCE TO RELATED APPLICATIONS

This application is a divisional under 35 U.S.C. § 120 of U.S. atent application Ser. No. 15/465,082, filed Mar. 21, 2017, and issued as U.S. Pat. No. 10,406,703, which is a continuation application of U.S. patent application Ser. No. 14/531,463, filed Nov. 3, 2014, and issued as U.S. Pat. No. 9,604,372, which is a divisional application of U.S. patent application Ser. No. 13/162,084, filed Jun. 16, 2011, and issued as U.S. Pat. No. 8,876,981, each of which are hereby incorporated by reference in their entireties.

TECHNICAL FIELD

The present invention relates to a hair clipper filtering assembly and a method for clipping, removing shaved or clipped hair from the clipped site, and filtering the clipped hair. More specifically, the present invention is a disposable hair clipper filter assembly.

BACKGROUND

Clipping of hair is a common action and is often performed on sites which further require removal of the clipped hair. An example of such a site may be found in the surgical arena, in which the areas of incision on surgical patients may be shaved prior to invasive or surgical procedures to thereby remove hair that might harbor germs and thus serve as a source of contamination. Loose hair clippings that remain on the patient fall onto the sheets, covers and bed surroundings and must be picked up and removed. At present, the most common protocol for picking up the loose hair clippings is to press an adhesive backed material, usually tape, against the area where the clipped hair remains. This method is unsanitary, inefficient and misses many hair clippings, all of which are potentially harmful to the patient. Furthermore, adhesive tapes are not typically kept under sterile conditions. This increases the risk of spreading infectious contaminants through the surgical suite and possibly throughout the medical facility. In addition, patients may be allergic or otherwise reactive to the adhesive used in tape. Thus, there is a need for a more efficient, sanitary and cost effective method for clipping and hair removal.

Clippers having a vacuum capability have been used with some success, but these often exacerbate the situation when, for example, vacuum filtration is inadequate, unsanitary, or requires frequent cleaning. In previously known vacuum arrangements, a filter bag or other collection structure may be arranged in-line with vacuum flow to receive the clipped hair. Known devices typically further require the filter bag or other known collection structure to be removed from the apparatus, emptied into a trash container, and reinstalled on the apparatus after each use, or while using in the event of a clogged filter. This practice is cumbersome and unsanitary. In contrast, the present disposable filter assembly may be removed from the vacuum hose and canister and entirely disposed of without the need for opening or reuse. Alternatively, the vacuum hose, nozzle and filter assembly may be removed from the canister for disposal. This greatly reduces the incidence of contamination. Further, the unique arrangement of the various components of the present assembly promotes filter life and reduces occurrences of filter clogging, as will be discussed below.

DESCRIPTION

The present invention pertains to a filter assembly that is designed to securely attach to a vacuum apparatus and for use in conjunction with a hair clipper. The filter assembly preferably includes a housing having a top piece and a bottom piece. The assembly further includes a filter member. The components may be generally circular in shape. The top piece is preferably formed having a generally circular perimeter with an orifice located on the perimeter such that the orifice is adapted for tangential acceptance of a vacuum hose. The specific arrangement of components, including the tangential position of the orifice, creates a hair collecting vortex within the assembly when a vacuum source is attached and activated. This unique configuration promotes a more efficient and even accumulation of the cut hairs on the filter member, thereby increasing the longevity and effectiveness of the filter member. Further, the filter is placed between the top piece and the bottom piece to collect the cut hair, yet the filter is porous enough to allow enough air to pass through to create a sufficient vacuum.

One benefit of the present filter assembly is that it may be easily removed from the vacuum apparatus after use and the entire assembly can be disposed of. This feature eliminates the need to open the assembly to clean the filter, thereby vastly reducing the mess and potential contamination associated with hair removal.

DETAILED DESCRIPTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
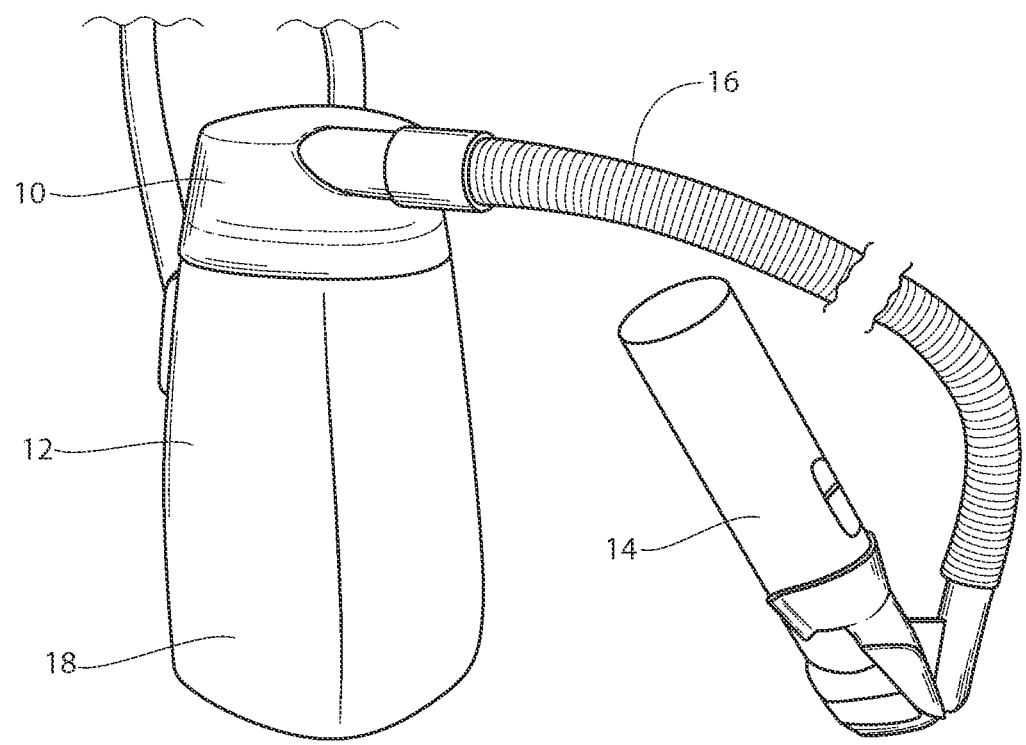
FIG. 1 is a perspective view illustrating a clipper vacuum system utilizing the filter system of the present invention.

As seen in the view of FIG. 1, the present invention pertains to a filter assembly 10 that is designed to securely attach to a vacuum apparatus 12 and for use in conjunction with a hair clipper 14. As illustrated, a clipper 14 may be used to initially remove hair from a target site, such as a surgical area. A vacuum apparatus 12, such as the one depicted in FIG. 1, draws the cut hair through a vacuum hose 16 and into a canister 18.

Figure 2:
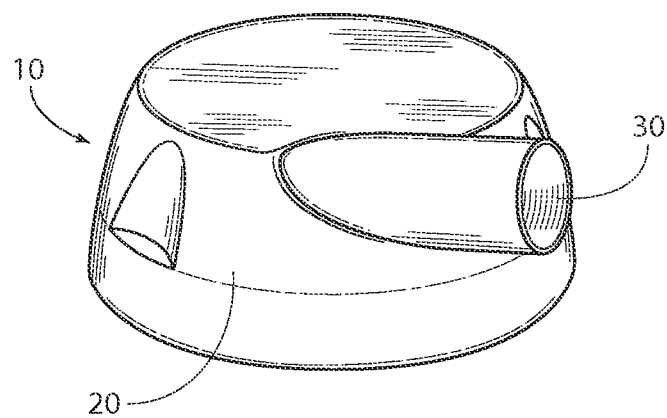
FIG. 2 is a perspective view of a filter system according to the present invention.
Figures 3, 4:
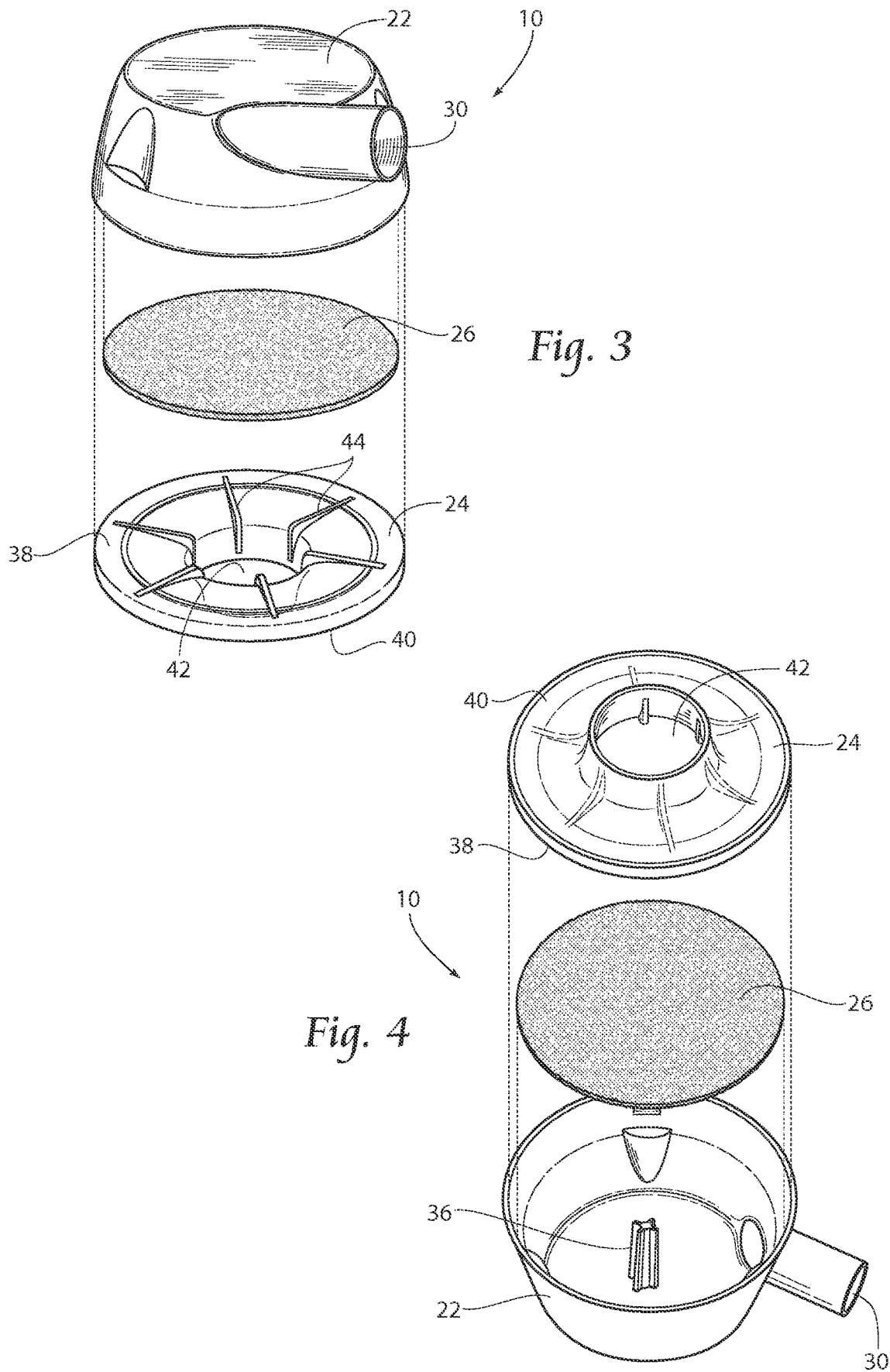
FIG. 3 is an exploded view of the system illustrated in FIG. 2.
FIG. 4 is an exploded view similar to that of FIG. 3, but showing the system rotated to a bottom view.
Figure 5:
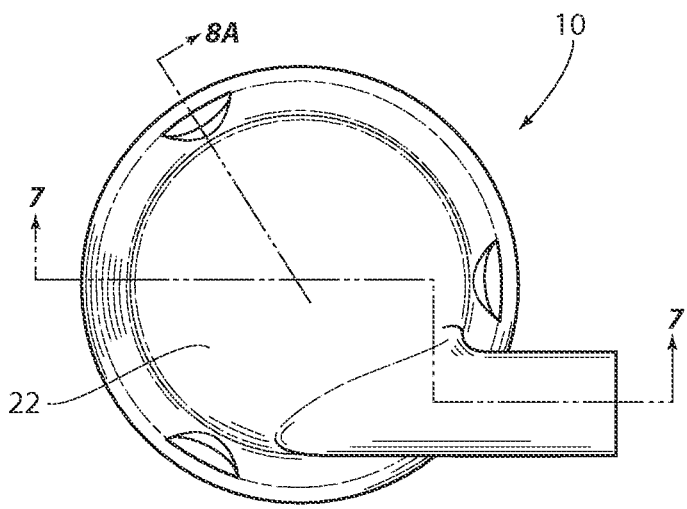
FIG. 5 is a top view of the system illustrated in FIGS. 2-4.
Figure 6:
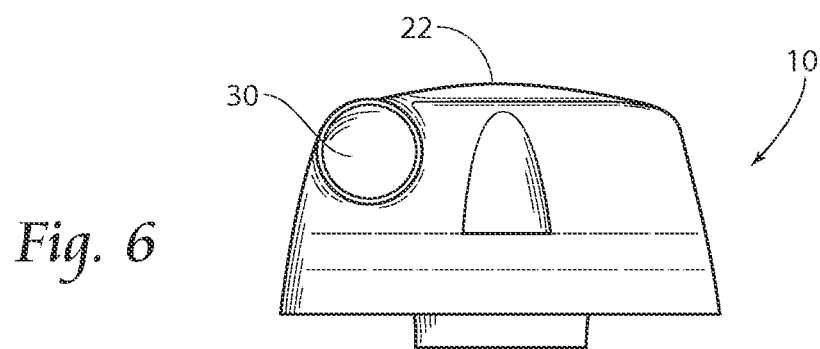
FIG. 6 is a side view of the system illustrated in FIGS. 2-5.
Figure 7:
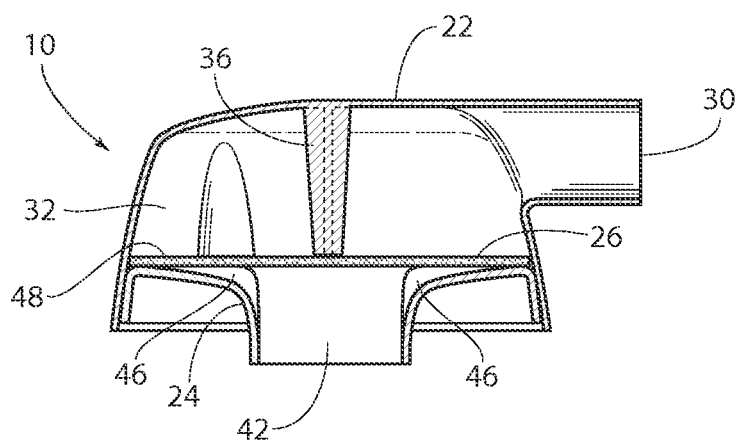
FIG. 7 is a cross sectional view of the system shown in FIG. 5 and taken along lines 7-7 thereof.

As illustrated, in FIGS. 2-4, an assembly 10 according to the present invention preferably includes a housing 20 having a top piece 22 and a bottom piece 24. A filter member 26 is positioned within the housing 20 and is held in place by the top and bottom pieces 22, 24. As seen, the various components 22, 24, 26 preferably have a generally circular perimeter. As is further illustrated, the circular perimeter 28 of the top piece 22 includes a tubular input aperture 30 which is arranged to tangentially communicate with the interior 32 of the assembly 10. As seen, the input aperture 30 is further adapted to accept a vacuum hose 16 from a vacuum apparatus 12. The housing 20 may be manufactured by injection molding or other acceptable means. The top and bottom pieces 22, 24 may be preferably assembled by use of a snap fit, but it is to be understood that other assembly means may be used such as sonic welding, gluing, or screwing, by way of non-limiting example.

Figure 8A:
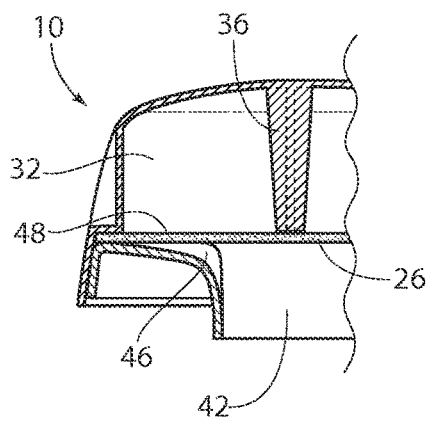
FIG. 8A is a fragmentary cross sectional view of the system shown in FIG. 5 and taken along line 8 thereof.
Figure 8B:
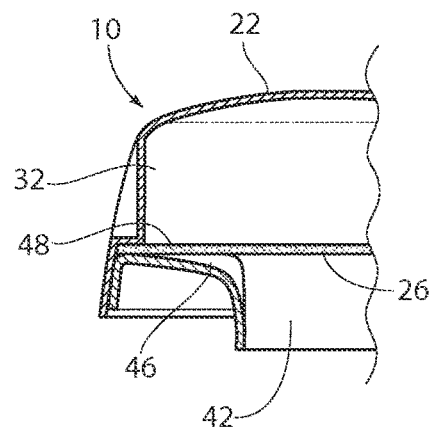
FIG. 8B is a view similar to that of FIG. 8A, but illustrating an alternative embodiment.
Figure 9:
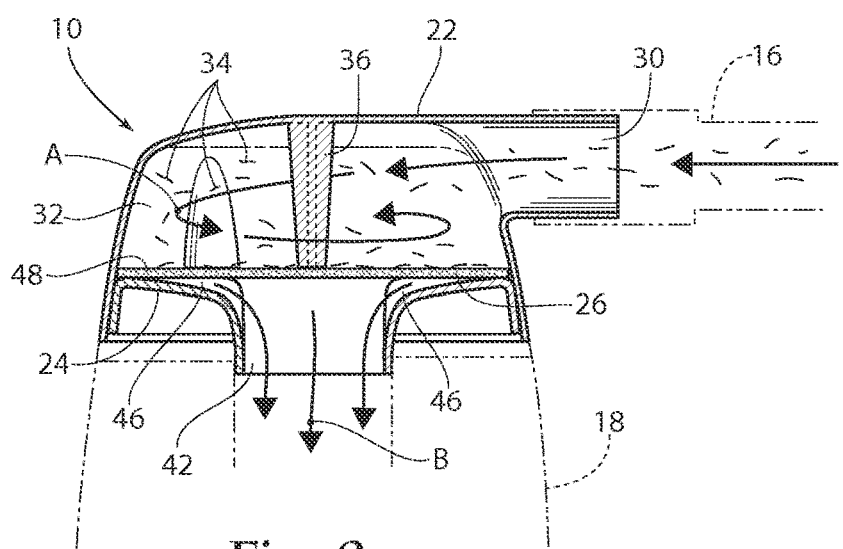
FIG. 9 is a cross sectional view, similar to that of FIG. 7, but illustrating movement of clipped hair within the system.
Figure 10:
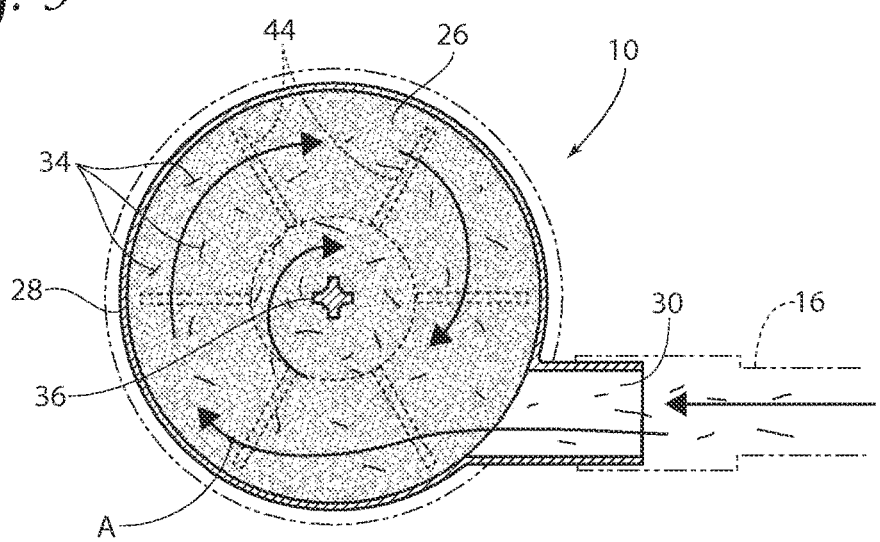
FIG. 10 is a top view further illustrating movement shown in FIG. 9.
Figure 11:
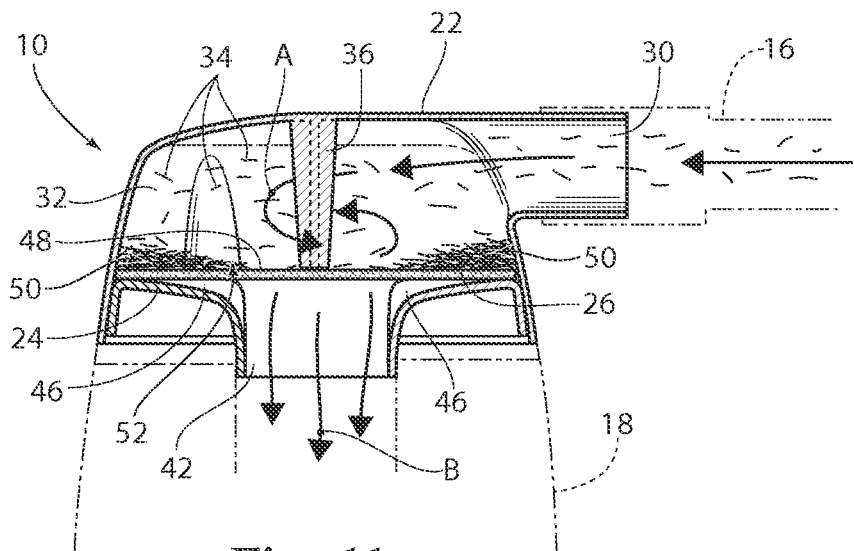
FIG. 11 is a view similar to that of FIG. 9, but illustrating further accumulation of clipped hair on the filler.
Figure 12:
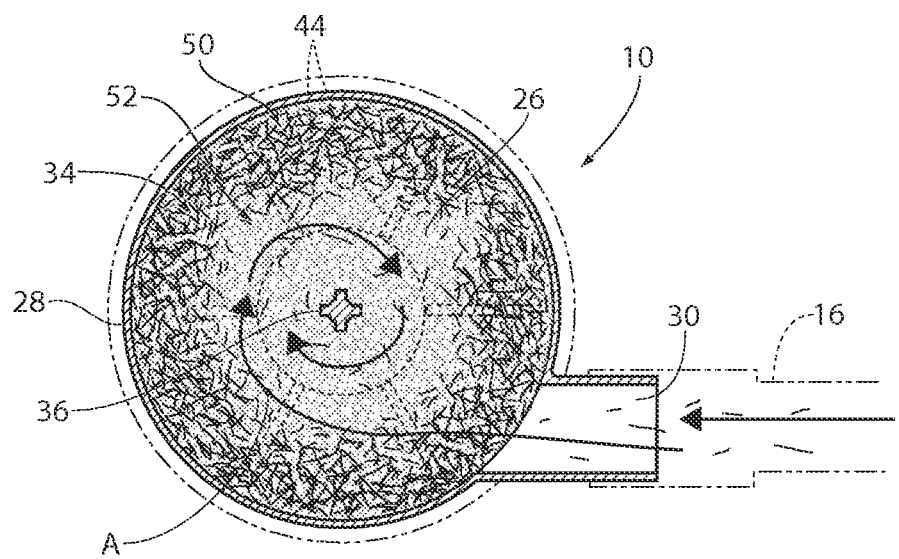
FIG. 12 is a view similar to that of FIG. 10, but illustrating continued movement within the system during accumulation of clipped hair on the filter.

As viewed specifically in FIGS. 9-12., the unique tangential arrangement of input aperture 30 causes the cut hairs 34 to move in a spiral, hair collecting vortex in the direction of arrows A. As illustrated, the spiral may move about a supporting spindle 36, or alternatively, a spindle may be absent, as is seen in FIG. 8B. The movement of cut hair 34 in the vortex-like or spiral movement within the assembly 10 promotes better distribution of accumulated cut hairs 34 on the filter member 26. Furthermore, as the cut hairs 34 continue to move in a vortex-like manner in the direction of arrows A, the filter member 26, which is placed between the top piece 22 and the bottom piece 24, collects the cut hair 34. As further seen in FIGS. 11 and 12, the tangential arrangement of input aperture 30 and the resultant movement in the direction of arrows A also causes the cut hairs 34 to initially accumulate on an outer edge 50 of the filter member 26 surface 48 and, as collection continues, to continually accumulate closer to an inner filter portion 52. The progression of cut hair 34 accumulation, from outer filter edge 50 to inner filter portion 52 during hair collection, increases filter 26 longevity by maximizing filter member 26 usage through incremental collection. Further, as the surface 48 of filter member 26 becomes covered with cut hair 34, filter pressure will drop; however cut hair 34 accumulation from outer filter edge 50 to inner filter portion 52 as is achieved with the present assembly 10, will minimize filter pressure decreases during use. This will further increase the longevity of the assembly 10.

The filter member 26 used with the present system preferably has a porous characteristic adequate to allow enough air to pass through in the direction of arrows B to thereby create suction sufficient to continue the procedure, while maintaining cut hair collection capabilities. An example of a filter member 26 for use with the present assembly may be one designed to filter out various sized particles, e.g. bacteria and virus, with different percentage of effectiveness, with a preferred filter member 26 having a Minimum Efficiency Reporting Value (MERV) of about 16.

Illustrated in FIGS. 3, 4, 7, 8A, 8B it may be seen that the bottom piece 24 of the assembly 10 may include a top surface 38 facing the filter member 26, and an outer, bottom surface 40. The respective surfaces 38, 40 further define a vacuum aperture 42 there through. As seen, the vacuum aperture 42 is adapted for communication with a vacuum canister 18 which provides the vacuum source. The vacuum aperture 42 further enables the assembly 10 to function in line with the hose member 16 to collect the hair clippings 34. The top surface 38 may be further provided with a plurality of supporting ribs 44. As shown, the ribs 44 provide support for the filter member 26. As seen specifically in FIGS. 7, 8A, 8B, and 9, the ribs 44 may be formed to further provide interstices 46 between a supported filter member 26 and the aperture 42 to thereby allow vacuum forces exerted by the vacuum apparatus 12 to be applied fully across the entire filter member 26 surface 48. This action further encourages even distribution of cut hair 34 over the filter member 26 surface 48.

The present invention may further include a cut hair collection method including:
providing a vacuum source proximate; the cut hair;
providing a filter assembly having a top piece and a bottom piece defining an interior cavity, and a filter member located within the cavity, the assembly having a generally circular perimeter;
providing the circular perimeter of the top piece with a tubular input aperture arranged to tangentially communicate with the interior, the input aperture being adapted to accept a vacuum hose;
providing the bottom piece with a top surface facing the filter member, and an outer, bottom surface; the surfaces further being provided with a vacuum aperture there through;
applying a vacuum to the assembly interior through the vacuum aperture;
moving the cut hairs through the input aperture and into the assembly;
circulating the cut hairs in a collecting vortex; and
collecting the cut hair on the filter member.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:
1. A filter system comprising:
a housing for a vacuum filter assembly, the housing comprising:
a top piece with an upper portion defining a top wall of a cavity and a generally circular perimeter forming a side wall of the cavity, where the perimeter is configured to receive a filter member; and
a bottom piece securable to the top piece, the bottom piece including:
a surface defining a bottom wall of the cavity;
a vacuum aperture extending through the surface and configured to provide communication between the cavity and a vacuum source; and
a plurality of ribs extending into the cavity from the bottom wall,
a filter member being generally planar and having a circular shape, the filter member contacting and supported directly on the plurality of ribs such that the plurality of ribs provide interstices between the supported filter member and the bottom wall of the cavity.

2. The filter system of claim 1, wherein the housing further comprises an input aperture extending through the top piece and arranged for tangential communication with the cavity.

3. The filter system of claim 1, wherein the housing further comprises a spindle extending into the cavity from the top wall of the cavity such that a material drawn into the cavity by a vacuum force moves in a spiral vortex through the cavity about the spindle.

4. The filter system of claim 3, wherein the spindle is centered with respect to the generally circular perimeter of the top piece.

5. The filter system of claim 3, wherein the spindle is configured to contact and support a top surface of the filter member.

6. A filter system, the filter system comprising:
   a housing comprising:
      a top piece with an upper portion defining a top wall of a cavity and a generally circular perimeter forming a side wall of the cavity, the housing having an input aperture arranged for communication with the cavity; and
      a bottom piece with a surface defining a bottom wall of the cavity, where the bottom piece includes a vacuum aperture extending through the surface and configured to provide communication between the cavity and a vacuum source, the bottom piece comprising a plurality of ribs extending into the cavity from the bottom wall; and
   a filter member held in the cavity between the top piece and the bottom piece, the filter member being generally planar and having a circular shape, the filter member contacting and supported directly on the plurality of ribs such that the plurality of ribs provide interstices between the supported filter member and the bottom wall of the cavity.

7. The filter system of claim 6, where the input aperture is located on the perimeter of the top piece.

8. The filter system of claim 7, where the input aperture is arranged tangentially on the perimeter.

9. The filter system of claim 6, where a spindle is configured to contact and support a top surface of the filter member.

10. The filter system of claim 6, where the filter member has a Minimum Efficiency Reporting Value (MERV) of about 16.

11. A method of providing a filter system, the method comprising:
    placing a filter member in a housing, the housing comprising:
       a top piece with an upper portion defining a top wall of a cavity and a generally circular perimeter forming a side wall of the cavity, the housing having an input aperture arranged for communication with the cavity; and
       a bottom piece with a surface defining a bottom wall of the cavity, where the bottom piece includes a vacuum aperture extending through the surface and configured to provide communication between the cavity and a vacuum source, the bottom piece comprising a plurality of ribs extending into the cavity from the bottom wall; and
    connecting the top piece and the bottom piece with the filter located in the cavity;
    wherein the filter member is generally planar and has a circular shape, the filter member contacting and supported directly on the plurality of ribs such that the plurality of ribs provide interstices between the supported filter member and the bottom wall of the cavity.

12. The method of claim 11, where the input aperture is located on the perimeter of the top piece.

13. The method of claim 12, where the input aperture is arranged tangentially on the perimeter.

14. The method of claim 11, where a spindle is configured to contact and support a top surface of the filter member.

15. The method of claim 11, where the filter member has a Minimum Efficiency Reporting Value (MERV) of about 16.

* * * * *